US007088957B2

(12) United States Patent
Ling et al.

(10) Patent No.: US 7,088,957 B2
(45) Date of Patent: Aug. 8, 2006

(54) METHOD AND APPARATUS FOR DETERMINING THE CLOSED LOOP POWER CONTROL SET POINT IN A WIRELESS PACKET DATA COMMUNICATION SYSTEM

(75) Inventors: Fuyun Ling, San Diego, CA (US); Peter J. Black, San Diego, CA (US)

(73) Assignee: Qualcomm Incorporated., San Diego, CA (US)

( * ) Notice: Subject to any disclaimer, the term of this patent is extended or adjusted under 35 U.S.C. 154(b) by 267 days.

(21) Appl. No.: 10/651,834

(22) Filed: Aug. 28, 2003

(65) Prior Publication Data

US 2004/0062225 A1    Apr. 1, 2004

Related U.S. Application Data

(63) Continuation of application No. 09/370,081, filed on Aug. 6, 1999, now Pat. No. 6,633,552.

(51) Int. Cl.
*H04B 7/00* (2006.01)
*H04Q 7/20* (2006.01)

(52) U.S. Cl. ............... 455/67.11; 455/69; 455/522; 370/318

(58) Field of Classification Search ............... 455/69, 455/522, 67.11, 13.4; 370/318, 335, 342
See application file for complete search history.

(56) References Cited

U.S. PATENT DOCUMENTS

| 4,901,307 | A |   | 2/1990 | Gilhousen et al. |
|-----------|---|---|--------|------------------|
| 5,056,109 | A |   | 10/1991 | Gilhousen et al. |
| 5,101,501 | A |   | 3/1992 | Gilhousen et al. |
| 5,103,459 | A |   | 4/1992 | Gilhousen et al. |
| 5,109,390 | A |   | 4/1992 | Gilhousen et al. |
| 5,414,796 | A |   | 5/1995 | Jacobs et al. |
| 5,504,773 | A |   | 4/1996 | Padovani et al. |
| 5,506,865 | A |   | 4/1996 | Weaver, Jr. |
| 5,559,789 | A | * | 9/1996 | Nakano et al. ............. 370/342 |
| 5,604,730 | A | * | 2/1997 | Tiedemann, Jr. ............ 370/252 |
| 5,659,569 | A |   | 8/1997 | Padovani et al. |
| 5,839,056 | A | * | 11/1998 | Hakkinen ..................... 455/69 |
| 5,903,554 | A | * | 5/1999 | Saints ........................ 370/342 |
| 5,933,781 | A | * | 8/1999 | Willenegger et al. ....... 455/522 |
| 5,946,346 | A | * | 8/1999 | Ahmed et al. .............. 375/219 |
| 6,035,209 | A | * | 3/2000 | Tiedemann et al. ......... 455/522 |
| 6,067,292 | A | * | 5/2000 | Huang et al. ................ 370/342 |
| 6,070,086 | A | * | 5/2000 | Dobrica ...................... 455/522 |
| 6,097,972 | A | * | 8/2000 | Saints et al. ................ 455/572 |
| 6,173,162 | B1 | * | 1/2001 | Dahlman et al. ............. 455/69 |
| 6,185,408 | B1 | * | 2/2001 | Leopold et al. ............ 455/12.1 |
| 6,308,080 | B1 | * | 10/2001 | Burt et al. ................... 455/522 |

(Continued)

FOREIGN PATENT DOCUMENTS

EP          0853393          7/1998

(Continued)

*Primary Examiner*—Simon Nguyen
(74) *Attorney, Agent, or Firm*—Philip R. Wadsworth; Thien T. Nguyen; George J. Oehling (57) ABSTRACT

According to one aspect of the invention, a method for determining a power control set point is provided. In one embodiment, the power control set point is determined based on one or more factors including a first factor corresponding to a pilot bit error rate, a second factor corresponding to a normalized signal variance, and a third factor corresponding to an average number of fingers in lock.

19 Claims, 5 Drawing Sheets

U.S. PATENT DOCUMENTS

| | | | |
|---|---|---|---|
| 6,341,224 B1 * | 1/2002 | Dohi et al. | 455/522 |
| 6,377,813 B1 * | 4/2002 | Kansakoski et al. | 455/522 |
| 6,396,804 B1 | 5/2002 | Odenwalder et al. | |
| 6,421,327 B1 * | 7/2002 | Lundby et al. | 370/310 |
| 6,574,211 B1 | 6/2003 | Padovani et al. | |
| 6,633,552 B1 * | 10/2003 | Ling et al. | 370/318 |
| 6,658,045 B1 * | 12/2003 | Jin | 375/147 |
| 6,690,944 B1 * | 2/2004 | Lee et al. | 455/522 |

FOREIGN PATENT DOCUMENTS

| | | |
|---|---|---|
| WO | 9910985 | 3/1999 |
| WO | 9918702 | 4/1999 |

\* cited by examiner

METHOD AND APPARATUS FOR DETERMINING THE CLOSED LOOP POWER CONTROL SET POINT IN A WIRELESS PACKET DATA COMMUNICATION SYSTEM

CLAIM OF PRIORITY UNDER 35 U.S.C. § 120

The present Application for Patent is a Continuation and claims priority to U.S. Pat. No. 6,633,552, entitled, "Method and Apparatus for Determining the Closed Loop Power Control Set Point in a Wireless Packet Data Communications System," issued Oct. 14, 2003, and assigned to the assignee hereof and hereby expressly incorporated by reference herein.

BACKGROUND

1. Field

The present invention relates to communications. More particularly, the present invention relates to a novel and improved method and apparatus for controlling transmission energy in a wireless communication system.

2. Background

The use of code division multiple access (CDMA) modulation techniques is one of several techniques for facilitating communications in which a large number of system users are present. Other multiple access communication system techniques, such as time division multiple access (TDMA) and frequency division multiple access (FDMA) are known in the art. However, the spread spectrum modulation technique of CDMA has significant advantages over these modulation techniques for multiple access communication systems. The use of CDMA techniques in a multiple access communication system is disclosed in U.S. Pat. No. 4,901,307, entitled, "SPREAD SPECTRUM MULTIPLE ACCESS COMMUNICATION SYSTEM USING SATELLITE OR TERRESTRIAL REPEATERS," assigned to the assignee of the present invention, of which the disclosure thereof is incorporated by reference herein. The use of CDMA techniques in a multiple access communication system is further disclosed in U.S. Pat. No. 5,103,459, entitled, "SYSTEM AND METHOD FOR GENERATING SIGNAL WAVEFORMS IN A CDMA CELLULAR TELEPHONE SYSTEM," assigned to the assignee of the present invention, of which the disclosure thereof is incorporated by reference herein.

CDMA by its inherent nature of being a wideband signal offers a form of frequency diversity by spreading the signal energy over a wide bandwidth. Therefore, frequency selective fading affects only a small part of the CDMA signal bandwidth. Space or path diversity is obtained by providing multiple signal paths through simultaneous links from a mobile user through two or more cell-sites. Furthermore, path diversity may be obtained by exploiting the multipath environment through spread spectrum processing by allowing a signal arriving with different propagation delays to be received and processed separately. Examples of path diversity are illustrated in U.S. Pat. No. 5,101,501 entitled, "METHOD AND SYSTEM FOR PROVIDING A SOFT HANDOFF IN COMMUNICATIONS IN A CDMA CELLULAR TELEPHONE SYSTEM," and U.S. Pat. No. 5,109,390 entitled, "DIVERSITY RECEIVER IN A CDMA CELLULAR TELEPHONE SYSTEM," both assigned to the assignee of the present invention and incorporated by reference herein.

A method for transmission of speech in digital communication systems that offers particular advantages in increasing capacity while maintaining high quality of perceived speech is by the use of variable rate speech encoding. The method and apparatus of a particularly useful variable rate speech encoder is described in detail in U.S. Pat. No. 5,414,796, entitled, "VARIABLE RATE VOCODER," assigned to the assignee of the present invention and incorporated by reference herein.

The use of a variable rate speech encoder provides for data frames of maximum speech data capacity when said speech encoding is providing speech data at a maximum rate. When a variable rate speech coder is providing speech data at a less that maximum rate, there is excess capacity in the transmission frames. A method for transmitting additional data in transmission frames of a fixed predetermined size, wherein the source of the data for the data frames is providing the data at a variable rate is described in detail in U.S. Pat. No. 5,504,773, entitled, "METHOD AND APPARATUS FOR THE FORMATTING OF DATA FOR TRANSMISSION," assigned to the assignee of the present invention, of which the disclosure thereof is incorporated by reference herein. In the above mentioned patent application a method and apparatus is disclosed for combining data of differing types from different sources in a data frame for transmission.

In frames containing less data than a predetermined capacity, power consumption may be lessened by transmission gating a transmission amplifier such that only parts of the frame containing data are transmitted. Furthermore, message collisions in a communication system may be reduced if the data is placed into frames in accordance with a predetermined pseudorandom process. A method and apparatus for gating the transmission and for positioning the data in the frames is disclosed in U.S. Pat. No. 5,659,569, entitled, "DATA BURST RANDOMIZER," assigned to the assignee of the present invention, of which the disclosure thereof is incorporated by reference herein.

A useful method of power control of a mobile in a communication system is to monitor the power of the received signal from the mobile station at a base station. The base station in response to the monitored power level transmits power control bits to the mobile station at regular intervals. A method and apparatus for controlling transmission power in this fashion is disclosed in U.S. Pat. No. 5,056,109, entitled, "METHOD AND APPARATUS FOR CONTROLLING TRANSMISSION POWER IN A CDMA CELLULAR MOBILE TELEPHONE SYSTEM," assigned to the assignee of the present invention, of which the disclosure thereof is incorporated by reference herein.

In a communication system that provides data using a QPSK modulation format, information regarding the transmitted data signal can be obtained by taking the cross product of the I and Q components of the QPSK signal with the estimate of the communications channel. By knowing the relative phases of the two components, one can determine roughly the velocity of the mobile station in relation to the base station. A description of a circuit for determining the cross product of the I and Q components with the channel estimate in a QPSK modulation communication system is disclosed in U.S. Pat. No. 5,506,865, entitled, "PILOT CARRIER DOT PRODUCT CIRCUIT," assigned to the assignee of the present invention, the disclosure of which is incorporated by reference herein.

There has been an increasing demand for wireless communications systems to be able to transmit digital information at high rates. One method for sending high rate digital data from a remote station to a central base station is to allow the remote station to send the data using spread spectrum techniques of CDMA. One method that is proposed is to allow the remote station to transmit its information using a small set of orthogonal channels, this method is described in detail in U.S. Pat. No. 6,396,804, entitled, "HIGH DATA RATE CDMA WIRELESS COMMUNICATION SYSTEM," assigned to the assignee of the present invention and incorporated by reference herein.

Figure 1:
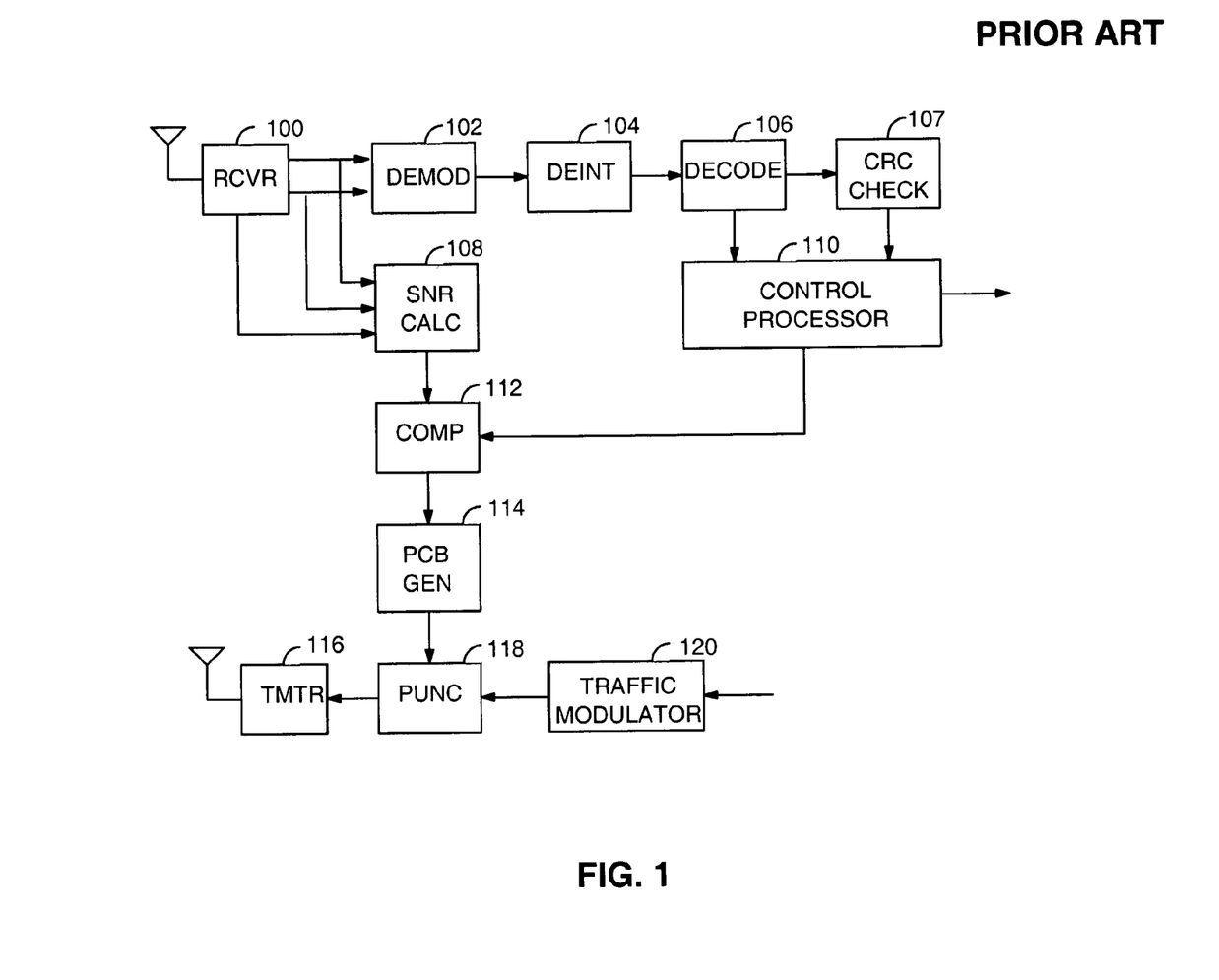
FIG. 1 is a block diagram of a closed loop power control system.

FIG. 1 illustrates a conventional system for generating closed loop power control commands. A signal is received at an antenna and provided to receiver (RCVR) 100. Receiver 100 down converts, amplifies and filters the received signal and provides the received signal to demodulator 102. Demodulator 102 demodulates the received signal. Within demodulator 102, is a channel estimate generator (not shown), which estimates the channel characteristics based on a transmitted signal with values known to both the transmitter and the receiver, referred to herein as the pilot signal. The pilot signal is demodulated and the phase ambiguities in the received signal are resolved by taking the dot product of the received signal and the pilot signal channel estimate. The demodulated signal is typically provided to a deinterleaver, which reorders the demodulated symbols in accordance with a predetermined reordering format.

The reordered symbols are provided to decoded 106. The decoded symbols are then optionally provided to a cyclic redundancy check (CRC) bit check element 107. CRC check element 107 locally generates a set of CRC bits from the decoded data and compares those locally generated bits with the estimated received CRC bits. CRC check element 107 provides a signal indicative of the checking of the CRC bits to control processor 110. In addition, decoder 106 may provide other quality metrics such as Yamamoto metric or symbol error rate to control processor 110. In response, control processor 110 outputs either the decoded frame of data or a signal indicative of the erasure of a frame.

In any communication system there is a nominal performance rate. In conventional systems, the performance is determined based upon the frame error rate of the received signal. The frame error rate depends on the average received signal to noise ratio of the received signal or other quality metric related to the received signal. When the frame error rate is less than the target frame error rate, the power control set point is decreased. Conversely, when the frame error rate is greater than the target frame error rate, the set point is increased. In one method for adjusting the signal to noise ratio threshold, the set point is increased by a relatively large amount, for example 1 dB, whenever a frame erasure is detected. Conversely, the signal to nose ratio threshold is decreased by 0.01 dB whenever a frame is properly decoded. Control processor 110 provides the set point to comparator (COMP) 112. In a pilot assisted coherent communication system, the signal to noise ratio is estimated based on the pilot signal. An exemplary method for estimating the signal to noise ratio based on the pilot signal is disclosed in U.S. Pat. No. 5,903,554, filed Sep. 27, 1996, entitled, "METHOD AND APPARATUS FOR MEASURING LINK QUALITY IN A SPREAD SPECTRUM COMMUNICATION SYSTEM," assigned to the assignee of the present invention and incorporated by reference herein.

The demodulated signal from demodulator 102 is provided to signal to noise ratio calculator (SNR CALC) 108. Signal to noise ratio calculator 108 computes the signal energy based on the energy of the demodulated symbols. In addition, a signal indicative of the received in band energy is provided to signal to noise ratio calculator 108. Signal to noise ratio calculator 108 generates an estimate of the signal to noise ratio of the received signal and provides this estimate to comparator 112.

In comparator 112, the estimated signal to noise ratio is compared with the power control loop set point provided by control processor 110. A signal indicative of the result of the comparison is provided to power control bit generator 114. If the estimated SNR is less than the set point, then power control bit generator 114 provides a message requesting that the transmitting device increase the energy of its transmissions. If the estimated SNR is greater than the set point, then power control bit generator 114 provides a message requesting that the transmitting device decrease the energy of its transmissions.

The power control message which is a single bit message requesting the transmitting device to increase or decrease its transmission energy by a predetermined amount is provided to puncturing element 118. Puncturing element 118 receives modulated traffic data from traffic modulator 120 and punctures the power control message into the traffic data in a predetermined fashion. The traffic data including the power control data is then upconverted, filtered and amplified for transmission to the transmitting device. In response the power control messages, the transmitting device (not shown) increases or decreases the energy of its transmissions in a predetermined fashion.

SUMMARY

The present invention is a novel and improved method and apparatus for performing closed loop power control. A method of implementing reverse link outer loop using only pilot signal is described. Such a method is especially useful when the data signals are only present in short burst such that packet or frame error rates (PER or FER) cannot be estimated accurately. Moreover, since this method provides a mechanism for accurate set point adjustment even without a PER (FER) estimate, it can also be used to improve the accuracy of outer loop performance when such estimate becomes available. The present invention estimates a "pilot bit error rate" (PBER), where each pilot "bit" consists of a number pilot chips distributed over a frame. In addition, it estimates the normalized variance of the signal energy (or C/I) for each packet. In addition, in the preferred embodiment, the average number of fingers that are in lock is also used to determine the power control set point.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION

The present invention describes a method of determining the set point of a closed loop power control system. In the exemplary embodiment, the present invention is applied to a packet data transmission system. In packet data transmission systems, data is transmitted in bursts and a significant period of time may elapse between the burst transmissions. In the exemplary embodiment, a pilot signal is transmitted even when no packet data is being transmitted. The exemplary embodiment of the present invention is discussed in terms of a system optimized for packet data transmission in a wireless communication system as described in detail in copending U.S. Pat. No. 6,574,211, filed Nov. 3, 1997 and entitled, "METHOD AND APPARATUS FOR HIGHER RATE PACKET DATA TRANSMISSIONMETHOD AND APPARATUS FOR HIGHER RATE PACKET DATA TRANSMISSION," which is assigned to the assignee of the present invention and incorporated by reference herein. The present invention may also be extended to other proposed systems that are planned to carry packet data transmissions, such as the Telecommunications Industry Association proposal to the International Telecommunications Union (ITU) entitled "The cdma2000ITU-R RTT Candidate Submission" and the European Telecommunications Standard Institute proposal to the International Telecommunications Union (ITU) entitled "The ETSI UMTS Terrestrial Radio Access (UTRA) ITU-R RTT Candidate Submission".

The present invention is especially useful when the data signals are transmitted in short bursts so that packet or frame error rates (PER or FER) cannot be estimated accurately. Such cases are quite common in a wireless packet data system such as described in the aforementioned U.S. Pat. No. 6,574,211. Moreover, since the present invention provides a mechanism for accurate set point adjustment even without PER (FER) estimate, it can also be used to improve the accuracy of outer loop performance when such estimate becomes available.

The present invention describes setting the power control set point based on a "pilot bit error rate" (PBER), where each pilot "bit" consists of a number of pilot chips distributed over a frame. In a preferred embodiment of the present invention, the set point is determined additionally in accordance with a normalized variance of the signal energy (or signal to noise interference) per slot for each packet and additionally employs the number of fingers in lock to determine the set point. By employing these two additional factors the set point can be determined to provide a good indication of PER (FER) almost independent of the channel characteristics, e.g. different Doppler spectrum. Thus, it is possible to determine the closed loop power control set point (T) based on these factors.

In the exemplary embodiment, there are 2048 chips in each slot organized as 32 groups with 64 chips each. The first 64 chips (zero'th group) is the reverse rate indicator (RRI). The rest of the even groups consists of the pilot signal and the odd groups are multiplexed control bits. Only the pilot signal groups are used in the set point determination method of the present invention. Two quantities generated from the pilot signal that are used by the outer loop are pilot bit error rate (PBER) and the normalized variance of the pilot energy.

Figure 2:
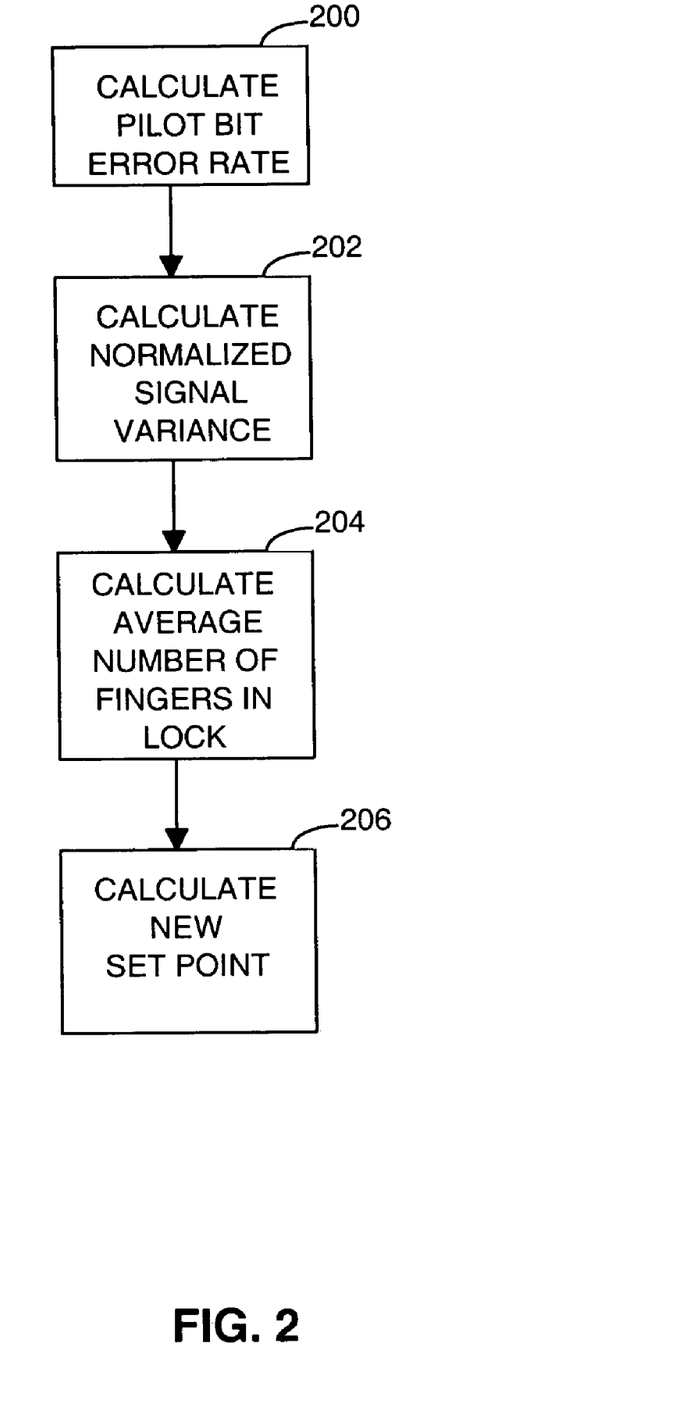
FIG. 2 is a flowchart illustrating the preferred method for determining the closed loop set point of the present invention.

Referring to FIG. 2, a method of determining the power control set point on the received pilot signal is illustrated. In block 200, the pilot bit error rate (PBER) is computed. In the exemplary embodiment, the pilot channel is modulated by spreading each symbol of the all zeroes symbol sequence using a four chip Walsh(0) sequence and pseudonoise (PN) sequence. One skilled in the art will readily appreciate that the present invention is equally applicable to other pilot channel structures. The first step in computing the pilot bit error rate is to despread the received samples. In the exemplary embodiment, the received samples are despread in accordance with a 4 chip Walsh(0) sequence and the PN sequence to provide 240 despread pilot samples in each slot.

The despread pilot samples are delayed and demodulated by the channel estimate. In the exemplary embodiment, the pilot signal is transmitted on the in-phase component of a QPSK modulated signal. In the exemplary embodiment, the real parts of the corresponding demodulated pilot samples of all the slots in a frame are combined to form 240 estimates of the pilot symbols. In the exemplary embodiment, the pilot symbols are the all zeroes sequence represented by a positive amplitude value. Conversely, one value symbols are represented with negative amplitudes. At the end of each frame, these samples are compared to zero. If any estimate is less than zero a pilot bit error is declared. By adjusting the power control set point to make the frame error rate equal to 1%, the number of average bit error per a frame is given in Table 1 for the case of two antennas with one path per antenna. Thus, in the simplest case the pilot bit error rate can be used to derive the set point by having knowledge of the motion of the transmitter relative to the receiver.

In step 202, the normalized signal variance is calculated. While the PBER is related to the frame error rate, it is also a function of vehicle speeds and other channel characteristics. An improved embodiment of the present invention describes a method for compensating for the effect of vehicle speed by using the normalized variance of the received signal power or C/I as described below.

In the exemplary embodiment, the closed loop power control commands are transmitted 600 times per second, i.e., a power command is generated every slot. In the exemplary embodiment, the normalized signal power variance (□) is defined as:

$$\rho = \sqrt{\frac{\overline{p(n)^2} - \overline{p(n)}^2}{\overline{p(n)}^2}} = \sqrt{\frac{\overline{p(n)^2}}{\overline{p(n)}^2} - 1}, \quad (1)$$

where p(n) is the measured power of the nth frame, $\overline{p(n)^2}$ is the average of the squared energy of the demodulated pilot symbols for the current frame, and $\overline{p(n)}^2$ is the average energy of the demodulated pilot symbols squared for the current frame.

Referring to Table 1 below, it can be observed that the pilot bit error rate and the normalized signal variance have different trends with respect to vehicle speed. Thus, it is possible to construct a linear combination of these two quantities, PBER+□₁□, which is nearly a constant independent of vehicle speeds as shown in Table 1.

TABLE 1

| Vehicle Speed | 0 kmph (AWGN) | 3 kmph | 10 kmph | 30 kmph | 120 kmph |
|---|---|---|---|---|---|
| Pilot bit error per frame | 5.29 | 4.5 | 4.036 | 3.33 | 3.58 |
| □ | 0.5 | 0.55 | 0.76 | 0.88 | 0.825 |
| PBER + □₁□₁□□ | 7.29 | 6.7 | 7.54 | 6.85 | 6.88 |

Practically, the average estimates of p and $p^2$ be computed by passing these estimates through a single pole low-pass filter defined as:

$$\overline{p}(n)=c_1\overline{p}(n-1)+C_2\cdot p(n) \quad (2)$$

and $$\overline{p^2}(n)=c_3\overline{p^2}(n-1)+c_4\cdot p^2(n) \quad (3)$$

where n is the frame index. In the exemplary embodiment, $c_1$ and $C_3$ are equal to 0.95 and $c_2$ and $C_4$ are equal to 0.05.

In block 204, the number of fingers in lock is computed. In the process of RAKE reception, the signal strength of each demodulated finger is computed. The signal strength must be in excess of a threshold value in order for it to be soft combined by the RAKE receiver. When the signal strength is sufficient that it is worthy of being soft combined, the finger is said to be "in lock". In the improved embodiment, the impact of multiple fingers is compensated for by making the set point a function of the average number of fingers that are in lock ($N_f$). In the exemplary embodiment, a determination as to whether a finger is in lock is conducted for each slot. In the exemplary embodiment, the average number of fingers in lock is computed by summing the number of fingers in lock for each slot in the frame and dividing by the number of slots in a frame.

In block 206, the set point is calculated. The first step in calculating the set point is to generate a metric ($\eta$) that is a function of the three factors described above. In the improved embodiment, the following metric described above is modified by the addition of a term that is a linear function of $N_f$, the number of fingers, works quite well.

$$\eta(n)=PBER(n-1)+\alpha_1\rho(n-1)+\alpha_2 N_f(n-1), \quad (4)$$

where, in the exemplary embodiment, where $\eta(n)$ is the metric for the current (nth) frame, PBER(n−1) is the pilot bit error rate for the previous ((n−1)st) frame and p(n−1) is the pilot variance for the previous ((n−1)st) frame, $N_f(n-1)$ is the number of fingers in lock in the previous frame and $\alpha_1$ and $\alpha_2$ are scaling constants equal to 4 and 0.9, respectively.

From Table 1, the outer-loop threshold is set to be 6.75 for $\alpha_1$ of 4.0. The outer loop threshold can be improved by accumulating statistics regarding the frame error rate. An error for the current frame ($\epsilon(n)$) is calculated according to the equation:

$$\epsilon(n)=\eta(n)-6.75. \quad (5)$$

The set point for the current frame (T(n)) is modified according to the equation:

$$T(n)=T(n-1)+\Delta\epsilon(n) \quad (6)$$

where in the exemplary embodiment, $\Delta$ is approximately 0.02.

Figure 3:
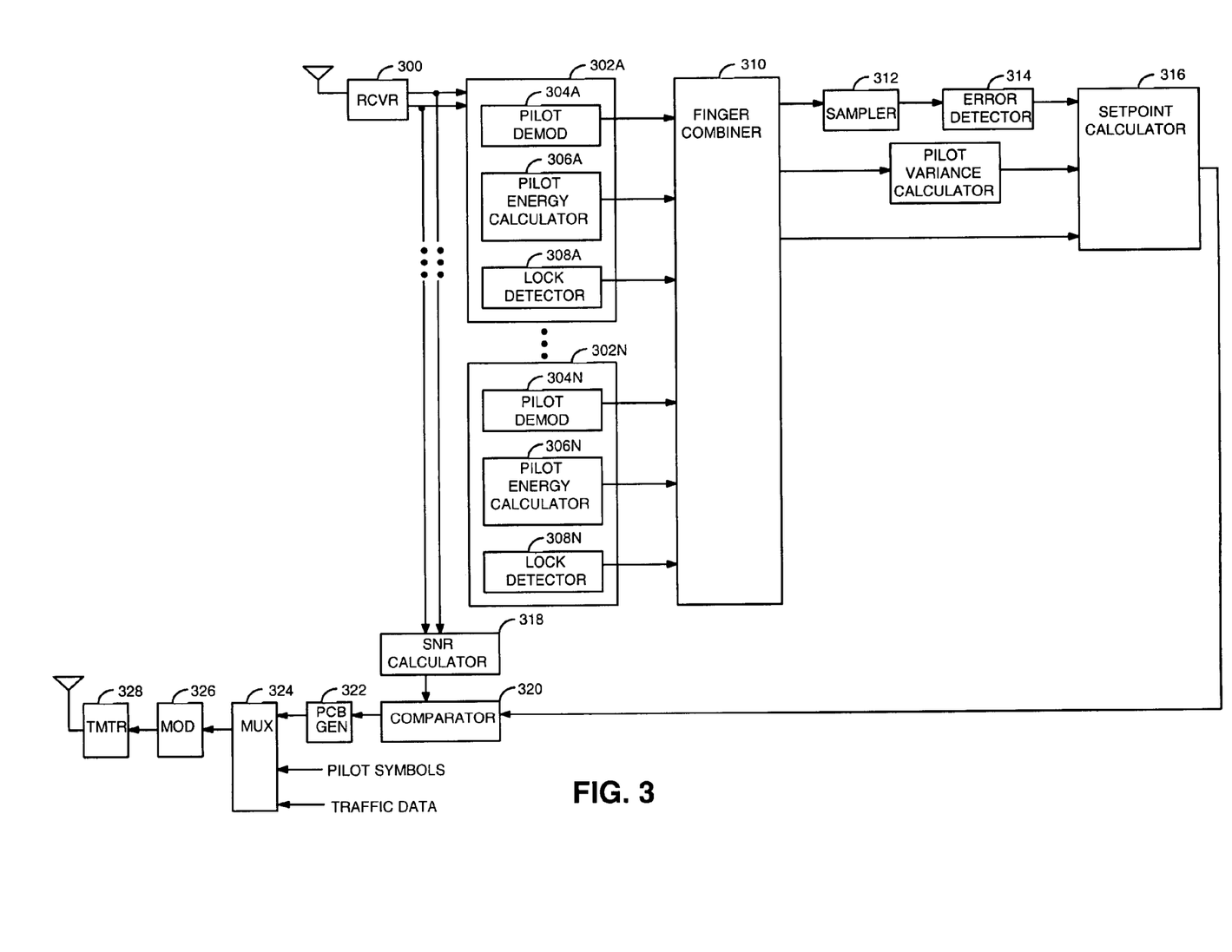
FIG. 3 is a block diagram illustrating the apparatus for generating closed loop power control commands of the present invention.

FIG. 3 illustrates the exemplary embodiment of the apparatus for determining the set point of the present invention. The signal is received at an antenna and provided to receiver 300. Receiver 300 downconverts, amplifies and filters the received signal. In the exemplary embodiment, receiver 300 down converts the received signal in accordance with a quaternary phase shift keying (QPSK) format and provides the resultant in-phase and quadrature-phase components to metric calculators 302. In the exemplary embodiment, a separate metric calculator 302 is provided for each finger being demodulated by the receiver system.

In each of metric calculators 302, pilot demodulator (PILOT DEMOD) 304 demodulates the received pilot symbol stream to provide estimates of the received pilot symbols and provides those demodulated pilot symbols to finger combiner 310. In each of metric calculators 302, pilot energy calculators 306 compute the energy of received pilot symbols and provide the measured energies to finger combiner 310. In addition, in each of metric calculators 302, lock detectors 304 determine whether the finger corresponding to the metric calculator 302 is in lock. Diversity reception in a CDMA communication system is well known in the art and is described in detail in aforementioned U.S. Pat. No. 5,109,390.

Finger combiner 310 sums the demodulated pilot symbol energies from each of pilot demodulators 304, sums the pilot symbol energies from each of pilot energy calculators 306 and sums the number of fingers determined to be in lock to provide the number of fingers in lock value $N_f$.

The combined pilot symbols are provided to optional sampler 312. Sampler 312 decimates the demodulated pilot symbols stream and provides the decimated stream to error detector 314. Because the values of the transmitted symbols are known to the receiver, detecting errors comprises comparing the received pilot symbol estimates decimated or intact to the expected pilot symbol sequence. In the exemplary embodiment, the pilot symbols are the all zeroes sequence, which are in represented as a positive amplitudes. Thus whenever the demodulated pilot symbol has a negative amplitude, a pilot bit error is declared by error detector 314. The number of detected pilot bit errors (PBER) is provided to set point calculator 316.

The combined pilot symbol energies, p(n), are provided to pilot variance calculator 315 which computes the normalized signal variance $\rho(n)$ as described in equations (1)–(3) above and provides the result to set point calculator 316.

Each of metric calculators 302 provides a signal indicative as to whether the finger to which the metric calculator is assigned is in lock during that slot. Finger combiner 310 sums the number of slots for which each of the fingers is in lock and divides by the number of slots in a frame to provide the average number of fingers in lock $N_f$. Finger combiner 310 provides a signal indicative the value $N_F$ to set point calculator 316.

In the preferred embodiment, set point calculator 316 determines the set point (T) in accordance with equations (4)–(6) above. Set point calculator 316 provides the set point (T) to comparator 320. Receiver 300 provides the base band samples to signal to noise ratio calculator 318. A large number of methods are known in the art to estimate the signal to noise ratio. A simple method for estimating the noise energy is to assume all in band energy is noise. Receiver 300 typically includes an automatic gain control (not shown) device and the in-band energy can typically be estimated based on the scaling of the received signal by the automatic gain control device. The signal energy can be estimated based on the energy of the demodulated traffic symbols. A number of methods for estimating the signal to noise ratio are disclosed in U.S. Pat. No. 5,903,554, filed Sep. 27, 1996 and entitled, "METHOD AND APPARATUS FOR MEASURING LINK QUALITY IN A SPREAD SPECTRUM COMMUNICATION SYSTEM," which is assigned to the assignee of the present invention and incorporated by reference herein.

The estimated signal to noise ratio is provided to comparator 320. In comparator 320, the estimated signal to noise ratio is compared to the threshold value (T). The power control command requesting that the transmitter either increase or decrease its transmission energy is determined in accordance with this comparison. The result of the comparison is provided to power control bit generator (PCB GEN) 322. If the estimated signal to noise energy exceeds the threshold (T), then power control bit generator 322 provides a message requesting that the remote station reduce its transmission energy. Conversely, if the estimated signal to noise energy is less than the threshold (T), then power control bit generator 322 provides a message requesting that the remote station increase its transmission energy. One skilled in the art will understand that the present invention although described in terms of reverse link power control can be extended to forward link power control.

The power control command from power control bit generator 322 is provided to multiplexer 324. In the exemplary embodiment, the power control commands are time multiplexed with the pilot signal and traffic data as described in the aforementioned U.S. Pat. No. 6,574,211. One skilled in the art will appreciate that although illustrated in a system in which the power control commands are time multiplexed into the transmitted frames of data, the present invention is equally applicable to communication systems in which the power control bits are punctured into the transmitted signals such as in the cdma2000 or WCDMA proposed systems.

The multiplexed frames of data is modulated by modulator 326. In the exemplary embodiment, the modulation is a spread spectrum communication signal. The modulated symbols are then provided to transmitter (TMTR) 328. Transmitter 328 up converts, amplifies and filters the signal for transmission.

Figure 4:
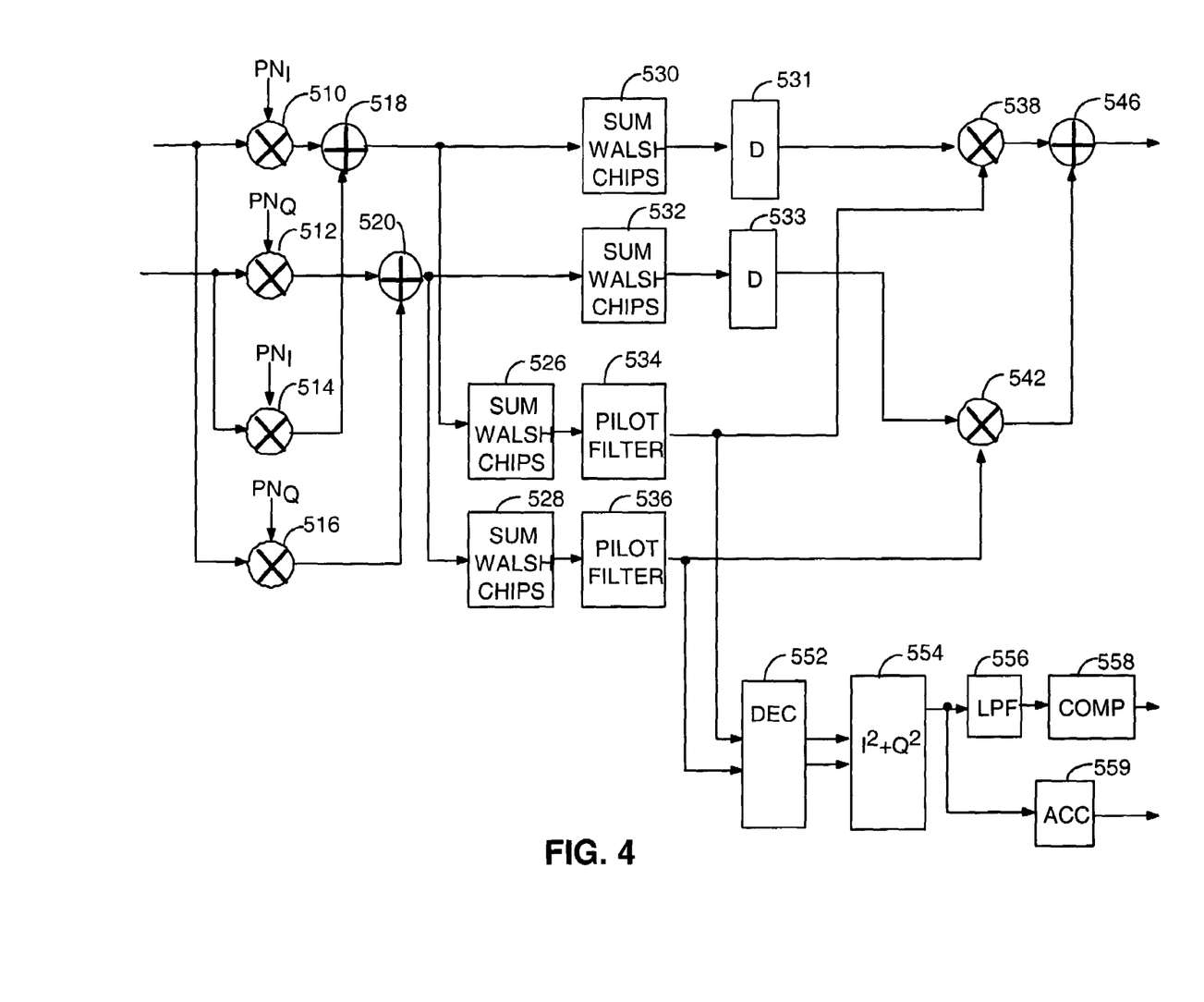
FIG. 4 is a block diagram illustrating the method of generating metrics to be used in the in the determination of the closed loop set point.

Turning now to FIG. 4, an expanded functional block diagram of metric calculators 302 is shown. As previously described, receiver (RCVR) 300 downconverts the received reverse link RF signals to a baseband frequency, producing I and Q baseband signals. In the exemplary embodiment, the received signal is complex PN spread using an in-phase $PN_I$ sequence and a quadrature phase $PN_Q$ sequence by methods that are well known in the art and are described in detail in the aforementioned U.S. Pat. No. 6,396,804. Despreaders 510 and 512 respectively despread the I and Q signals using the $PN_I$ sequence. Similarly, despreaders 514 and 516 respectively despread the Q and I signals using the $PN_Q$ sequence. The outputs of despreaders 510 and 512 are combined in combiner 518. The output of despreader 516 is subtracted from the output of despreader 512 in combiner 520.

The respective outputs of combiners 518 and 520 are summed over one Walsh symbol by accumulators 530 and 532. The outputs of accumulators 530 and 532 are provided to delay elements 531 and 533, respectively. Delay elements 531 and 533 are provided in order to equalize the additional delay that the filtered pilot signal experiences as a result of the filtering operating performed by pilot filters 534 and 536. The respective outputs of combiners 518 and 520 are also summed over one Walsh symbol by accumulators 526 and 528. The respective outputs of accumulators 526 and 528 are then applied to pilot filters 534 and 536. Pilot filters 534 and 536 generate an estimation of the channel conditions by determining the estimated gain and phase of the pilot signal data. The output of pilot filter 534 is then multiplied by the output of delay element 531 in multiplier 538. Similarly, the output of pilot filter 536 is multiplied by the output of delay element 533 in multiplier 542. The output of multiplier 542 is then summed with the output of multiplier 538 in combiner 546 to produce the demodulated pilot symbols.

In addition, the output of pilot filters 534 and 536 are provided to decimator 552. In the exemplary embodiment, pilot filters 534 and 536 are moving average filters that average the amplitudes of the received pilot symbols over a slot duration. Decimator 552 samples the outputs of pilot filters 534 and 536 at slot boundaries to provide the average symbols amplitudes for each slot in the frame.

The average symbol amplitudes averaged over each slot in the frame are provided to energy calculator ($I^2+Q^2$) 554. Energy calculator 554 sums the squares the amplitudes of the samples from pilot filters 534 and 536 and provides the resultant energy values to accumulator (ACC) 559. Accumulator 559 accumulates the energy of the slot over a frame duration and outputs the accumulated frame energy to set point calculator 316. In addition, the average slot energy values from energy calculator 554 are provided to low pass filter (LPF) 556. In the exemplary embodiment, low pass filter 556 computes the average pilot symbol energy over multiple slots and provides this value to comparator 558. Comparator 558 compares the average pilot symbol energy to a threshold value and based on this comparison determines whether the finger is in lock. Comparator 558 outputs the result of the comparison to finger combiner 310. It will be understood by one skilled in the art that there are many variations on the method presented herein for determining whether a finger is in lock and that the method present is for illustrative purposes.

Figure 5:
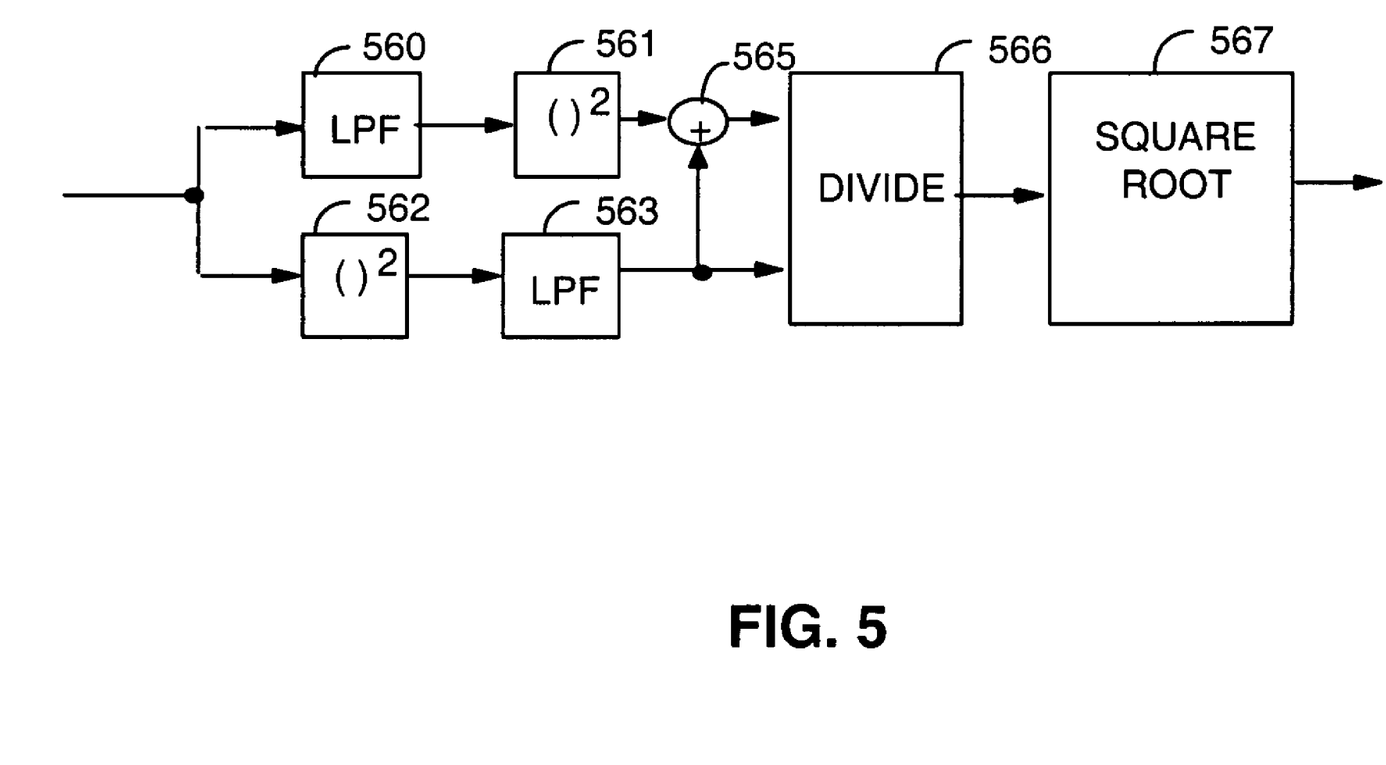
FIG. 5 is a block diagram illustrating an exemplary apparatus for determining the normalized signal variance for determination of the closed loop set point.

FIG. 5 provides an exemplary illustration of normalized signal variance calculator 315. The pilot symbol energies from accumulator 559 of each of pilot energy calculators 306 are summed in finger combiner 310 and provided to low pass filter (LPF) 560 and squaring element 562.

$$\bar{p}(n)$$

In the exemplary embodiment, low pass filter 560 is a single pole IIR averaging filter that computes the average symbol energy, $\bar{p}(n)$, of the combined pilot symbol energy over multiple frame duration. In the exemplary embodiment, the average symbol energy is computed in accordance with equation (2) above. The average symbol energy $\bar{p}(n)$ is provided to squaring element 561, which computes the square of the average symbol energy, $\overline{p(n)}^2$, and provides the value to a first input of summer 565.

Squaring element 562 squares the amplitudes of the combined symbol energies and provides the squared amplitude values to low pass filter (LPF) 563. Low pass filter 563 is an single pole IIR filter that computes the average of the squared energy values over the frame's duration, $\overline{p(n)^2}$. The output from low pass filter 563 is provided to a second summing input of summer 565. Summer 565 computes the sum of the square of the average symbol energy, $\overline{p(n)}^2$ and the average of the squared symbol energies $\overline{p(n)^2}$ and provides that sum to the numerator input of divider 566. Low pass filter 562 also provides the average of the squared energies to the denominator input of diving element 566. Dividing element 566 divides the sum from summer 565 by the average of the squared energies from low pass filter 562. The result of the division is provided to square root element 567 which calculates the square root of the division performed by dividing element 566. In the exemplary embodiment, the square root operation is performed by means of a table look up. It will be understood by one skilled in the art that other methods of determining the square root value are known and can be applied to the present invention without departing from the application's scope.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What is claimed is:

1. A method for determining a power control set point, comprising:
   receiving a pilot signal;
   calculating a pilot bit error rate based on the received pilot signal;
   calculating a normalized signal variance based on the received pilot signal;
   calculating an average number of fingers in lock based on the received pilot signal; and
   calculating the power control set point based one or more factors including a first factor corresponding to the pilot bit error rate, a second factor corresponding to the normalized signal variance, and a third factor corresponding to the average number of fingers in lock.

2. The method of claim 1 wherein calculating the pilot bit error rate includes:
   despreading the received pilot signal to generate despread pilot samples;
   demodulating the despread pilot samples to generate demodulated pilot samples;
   generating demodulated pilot symbols based on the demodulated pilot samples; and
   comparing the demodulated pilot symbols to a first predetermined threshold value.

3. The method of claim 2 wherein calculating the normalized signal variance includes:
   computing a first value corresponding to an average of the squared energy of the demodulated pilot symbols;
   computing a second value corresponding to a square of the average energy of the demodulated pilot symbols; and
   computing the normalized signal variance based on the first value corresponding to the average of the square energy of the demodulated pilot symbols and the second value corresponding to the square of the average energy of the demodulated pilot symbols.

4. The method of claim 1 wherein calculating the power control set point includes:
   generating a metric as a function of the first, second, and third factors; and
   determining an error rate based on the metric and a second predetermined threshold value.

5. The method of claim 1 wherein calculating the average number of fingers in lock comprises:
   determining, for each demodulated finger, whether the respective demodulated finger is in lock based on a signal strength of the respective demodulated finger and a third predetermined threshold value.

6. The method of claim 4 wherein the metric is modified by one or more scaling factors corresponding to a linear function of the average number of fingers in lock.

7. The method of claim 6 wherein the metric is generated according to the following formula:

$$\eta(n) = PBER(n-1) + \alpha_1 \rho(n-1) + \alpha_2 N_f(n-1),$$

where $\eta(n)$ represents the metric for a current (nth) frame, $PBER(n-1)$ represents the pilot bit error rate for a previous ((n−1)th) frame, $\rho(n-1)$ represents the pilot signal variance for the previous ((n−1)th) frame, $N_f(n-1)$ represents the average number of fingers in lock in the previous frame, and $\alpha_1$ and $\alpha_2$ represents first and second scaling factors.

8. An apparatus for determining a power control set point, comprising:
   means for receiving a pilot signal;
   means for calculating a pilot bit error rate based on the received pilot signal;
   means for calculating a normalized signal variance based on the received pilot signal;
   means for calculating an average number of fingers in lock based on the received pilot signal; and
   means for calculating the power control set point based one or more factors including a first factor corresponding to the pilot bit error rate, a second factor corresponding to the normalized signal variance, and a third factor corresponding to the average number of fingers in lock.

9. The apparatus of claim 8 wherein means for calculating the pilot bit error rate includes:
   means for despreading the received pilot signal to generate despread pilot samples;
   means for demodulating the despread pilot samples to generate demodulated pilot samples;
   means for generating demodulated pilot symbols based on the demodulated pilot samples; and
   means for comparing the demodulated pilot symbols to a first predetermined threshold value.

10. The apparatus of claim 9 wherein means for calculating the normalized signal variance includes:
    means for computing an average of the squared energy of the demodulated pilot symbols;
    means for computing a square of the average energy of the demodulated pilot symbols; and
    means for computing the normalized signal variance based on the average of the squared energy of the demodulated pilot symbols and the square of the average energy of the demodulated pilot symbols.

11. The apparatus of claim 8 wherein means for calculating the power control set point includes:
    means for generating a metric as a function of the first, second, and third factors; and
    means for determining an error rate based on the metric and a second predetermined threshold value.

12. The apparatus of claim 8 wherein means for calculating the average number of fingers in lock comprises:
    means for determining, for each demodulated finger, whether the respective demodulated finger is in lock based on a signal strength of the respective demodulated finger and a third predetermined threshold value.

13. The apparatus of claim 11 wherein the metric is modified by a scaling factor corresponding to a linear function of the average number of fingers in lock.

14. The apparatus of claim 13 wherein the metric is generated according to the following formula:

$$\eta(n) = PBER(n-1) + \alpha_1 \rho(n-1) + \alpha_2 N_f(n-1),$$

where $\eta(n)$ represents the metric for a current (nth) frame, $PBER(n-1)$ represents the pilot bit error rate for a previous ((n−1)th) frame, $\rho(n-1)$ represents the pilot signal variance for the previous ((n−1)th) frame, $N_f(n-1)$ represents the average number of fingers in lock in the previous frame, and $\alpha_1$ and $\alpha_2$ represents first and second scaling factors.

15. An apparatus for determining a power control set point, comprising:

a receiver to receive a pilot symbol stream comprising one or more pilot symbols;

one or more metric calculators coupled to the receiver, each metric calculator to demodulate the received pilot symbols to generate demodulated pilot symbols, compute energy of the received pilot symbols, and determine whether a finger corresponding to the respective metric calculator is in lock;

an error detector unit to determine a pilot bit error rate based on the demodulated pilot symbols and a predetermined pilot symbol sequence;

a variance calculator to compute a normalized signal variance based on the energy of the received pilot symbols; and a set point calculator to calculate the power control set point based on a first factor corresponding to the pilot bit error rate, a second factor corresponding to the normalized signal variance, and a third factor corresponding to an average number of fingers in lock.

16. The apparatus of claim 15 wherein each calculator comprises:

a demodulator to demodulate the received pilot symbols;

an energy calculator to compute the energy of the received pilot symbols; and a lock detector to determine whether the finger corresponding to the respective metric calculator is in lock.

17. The apparatus of claim 15 wherein the power control set point is calculated based on a metric corresponding to a function of the first, second, and third factors.

18. The apparatus of claim 17 wherein the metric is modified by a scaling factor corresponding to a linear function of the average number of fingers in lock.

19. The apparatus of claim 15 wherein the metric is generated according to the following formula:

$$\eta(n)=PBER(n-1)+\alpha_1\rho(n-1)+\alpha_2 N_f(n-1),$$

where $\eta(n)$ represents the metric for a current (nth) frame, $PBER(n-1)$ represents the pilot bit error rate for a previous ((n−1)th) frame, $\rho(n-1)$ represents the pilot signal variance for the previous ((n−1)th) frame, $N_f(n-1)$ represents the average number of fingers in lock in the previous frame, and $\alpha_1$ and $\alpha_2$ represents first and second scaling factors.

* * * * *